(12) United States Patent
Han

(10) Patent No.: US 9,207,851 B1
(45) Date of Patent: Dec. 8, 2015

(54) SENSING DISPLAYS UTILIZING LIGHT EMITTING DIODES

(75) Inventor: Jefferson Y. Han, Holliswood, NY (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 408 days.

(21) Appl. No.: 13/012,100

(22) Filed: Jan. 24, 2011

Related U.S. Application Data

(60) Provisional application No. 61/297,560, filed on Jan. 22, 2010.

(51) Int. Cl.
*G06F 3/042* (2006.01)
*G06F 3/0488* (2013.01)

(52) U.S. Cl.
CPC ............ *G06F 3/0488* (2013.01); *G06F 3/0421* (2013.01); *G06F 2203/04108* (2013.01); *G06F 2203/04808* (2013.01)

(58) Field of Classification Search
CPC .................... G06F 3/0421; G06F 2203/04109; G06F 2203/04108; G06F 3/0488; G06F 2203/04808; G09G 2360/148; H01L 31/125
USPC ............. 235/462.01, 462.09, 462.25, 462.42, 235/472.01, 454, 462.45; 345/173, 175, 345/156, 87, 104, 174, 102, 179, 176, 98, 345/100; 84/645, 622, 659, 723; 257/E31.096

See application file for complete search history.

(56) References Cited

U.S. PATENT DOCUMENTS

| | | | |
|---|---|---|---|
| 3,621,268 A | 11/1971 | Friedrich | |
| 4,202,000 A * | 5/1980 | Carballes | 257/85 |
| 4,424,524 A | 1/1984 | Daniele | |
| 4,692,739 A * | 9/1987 | Dorn | 341/31 |
| 4,958,148 A * | 9/1990 | Olson | 345/174 |
| 5,424,855 A | 6/1995 | Nakamura | |
| 6,787,810 B2 | 9/2004 | Choi et al. | |
| 7,042,444 B2 | 5/2006 | Cok | |
| 7,598,949 B2 | 10/2009 | Han | |
| 2003/0168668 A1* | 9/2003 | Choi et al. | 257/88 |
| 2004/0140960 A1* | 7/2004 | Cok | 345/175 |
| 2005/0134751 A1* | 6/2005 | Abileah et al. | 349/42 |
| 2006/0086896 A1* | 4/2006 | Han | 250/221 |
| 2006/0103637 A1* | 5/2006 | Yamaguchi et al. | 345/175 |
| 2006/0145053 A1* | 7/2006 | Stevenson et al. | 250/205 |
| 2006/0192766 A1* | 8/2006 | Nakamura et al. | 345/173 |
| 2007/0013646 A1* | 1/2007 | Harada | 345/102 |
| 2007/0046590 A1* | 3/2007 | Umezaki et al. | 345/76 |
| 2007/0216704 A1* | 9/2007 | Roberts et al. | 345/597 |
| 2007/0252005 A1* | 11/2007 | Konicek | 235/435 |
| 2008/0297487 A1* | 12/2008 | Hotelling et al. | 345/173 |
| 2008/0297709 A1* | 12/2008 | Eguchi | 349/139 |
| 2009/0033638 A1* | 2/2009 | Yamaguchi et al. | 345/176 |
| 2009/0128508 A1* | 5/2009 | Sohn et al. | 345/173 |
| 2009/0146967 A1* | 6/2009 | Ino et al. | 345/173 |
| 2009/0146992 A1* | 6/2009 | Fukunaga et al. | 345/214 |
| 2010/0002008 A1* | 1/2010 | Tsuzaki et al. | 345/581 |
| 2010/0060611 A1* | 3/2010 | Nie | 345/175 |

OTHER PUBLICATIONS

Echtler et al., "An LED-based Multitouch Sensor for LCD Screens," TEI 2010, Jan. 24-27, 2010, Cambridge, Massachusetts, USA, 4 pages.

* cited by examiner

*Primary Examiner* — Michael J Eurice
(74) *Attorney, Agent, or Firm* — Brandon Roper; Judy Yee; Micky Minhas

(57) ABSTRACT

A matrix of light emitting diodes is positioned behind a liquid crystal layer of a display device. The light emitting diodes operate in both light emitting and light detecting modes. Consequently, the display device is able to sense objects or fingers approaching or in contact with a front display surface of the display device based on changes in incident light on the matrix that are observed by one or more of the light emitting diodes operating in the light detecting mode.

9 Claims, 2 Drawing Sheets

SENSING DISPLAYS UTILIZING LIGHT EMITTING DIODES

CROSS REFERENCE TO RELATED APPLICATIONS

The present application claims the benefit of U.S. Provisional Application No. 61/297,560, filed Jan. 22, 2010, which is incorporated herein by reference in its entirety for all purposes.

TECHNICAL FIELD

This disclosure relates generally to display devices, such as liquid crystal display (LCD) devices, that are sensing enabled, and methods for using the same.

BACKGROUND

LCD devices are a well known class of devices for displaying graphical imagery.

SUMMARY

Techniques are described for sensing displays that utilize light emitting diodes.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

A matrix of LEDs is positioned behind the liquid crystal layer of an LCD device. For example, the matrix of LEDs may be a matrix of white LEDs. Such a matrix may include one or more rows and one or more columns, each of which includes one or more LEDs configured to emit white light. The matrix of white LEDs is optically and mechanically configured to function as a backlight for the LCD device, while also being electrically configured to operate its constituent LEDs in both light emitting and light detecting modes. Consequently, the apparatus is able to sense objects or fingers approaching or in contact with the front display surface of the LCD device based on changes in incident light on the LED matrix that are observed by one or more of the LEDs operating in the light detecting mode. Moreover, the apparatus may be able to achieve relatively dense spatial sensing resolution since each element of the LED matrix is capable of being operated in the light detecting mode.

Figure 1:
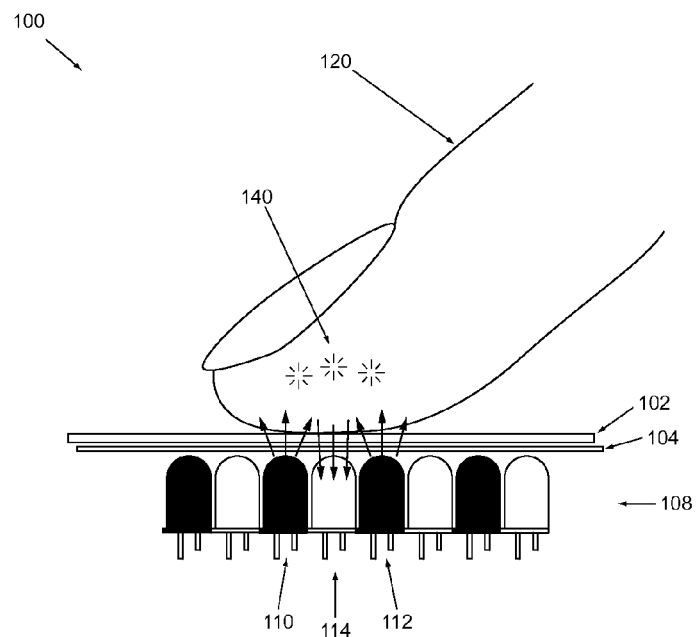
FIGS. 1 and 2 are schematic diagrams of example display devices.

FIG. 1 is a schematic diagram of an LCD device 100 that includes a liquid crystal layer 102 (e.g., including individual pixels of liquid crystal material) behind which one or more diffuser and/or enhancement films 104 and a matrix of white LEDs 108 are positioned. The LCD device 100 is configured to selectively switch the individual LEDs of the LED matrix 108 between operating in the light emitting and light detecting modes. For example, as illustrated in FIG. 1, the LCD device 100 is driving the individual LEDs of the LED matrix 108 such that alternating LEDs are operating in the light emitting and light detecting modes. Specifically, LEDs 110 and 112 are operating in the light emitting mode while LED 114 is operating in the light detecting mode. As a result, when finger 120 approaches or comes in contact with LCD device 100, light emitted by LEDs 110 and 112 may be scattered (e.g., as illustrated by scattered light 140) and/or reflected by finger 120 such that a portion of this scattered and/or reflected light enters and passes through the LCD device 100, where it is detected by LED 114 operating in the light detecting mode. The LCD device 100, therefore, can detect the presence of finger 120 and register a touch event in the vicinity of LED 114 based on output generated by LED 114 in response to sensing the light scattered and/or reflected by finger 120. In addition, LCD device 100 relies on the light emitted by the LEDs of LED matrix 108 to generate the backlight necessary to create an output display image.

Depending upon the implementation, either active matrix circuitry or passive matrix circuitry may be used to drive the pixels of the liquid crystal layer of the LCD device, turning individual pixels on or off to generate output display images in accordance with a video signal. Meanwhile, the LEDs are driven by separate circuitry such that they alternate between operating in the light emitting mode, providing the necessary backlight for the LCD device to generate an output image, and the light detecting mode, enabling the LCD device to sense touch input to or other interaction with the LCD device.

Figure 3:
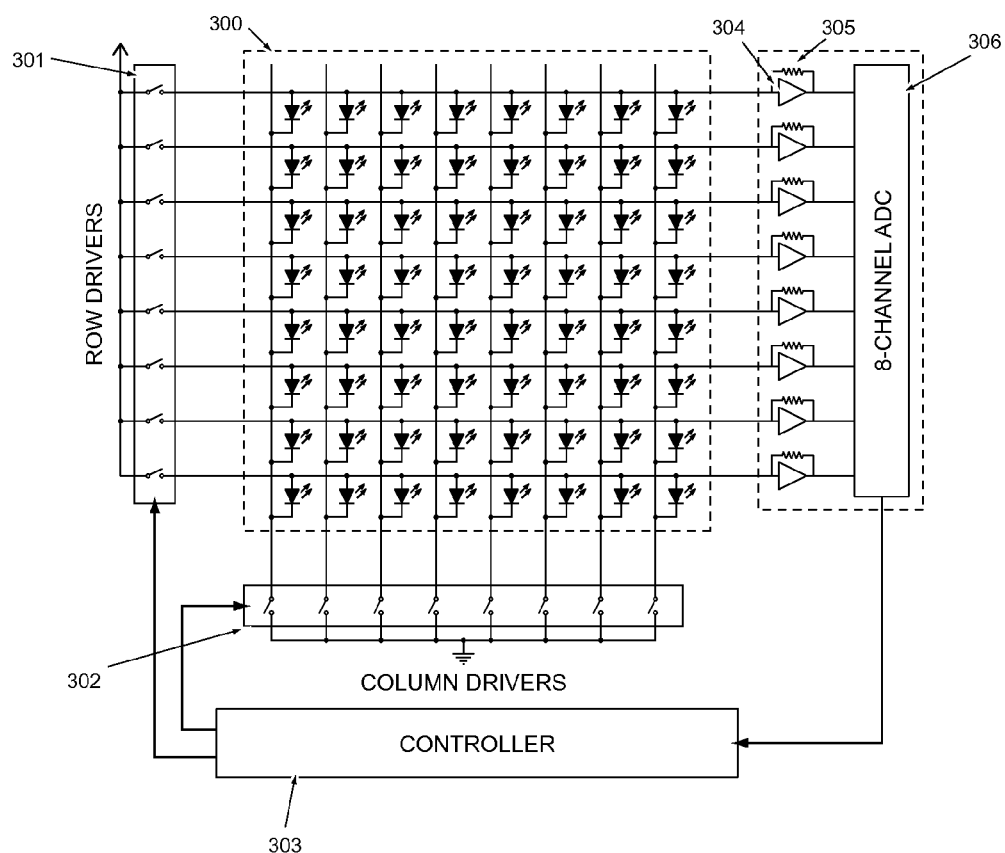
FIG. 3 is a schematic diagram of an example of an array of light emitting diodes and other components used to control the constituent light emitting diodes of the array.

FIG. 3 is a schematic diagram that illustrates an example of an array of LEDs 300 and other components used to control the constituent LEDs of the array 300. As illustrated in FIG. 3, an array 300 of individual LEDs are arranged in a matrix of rows and columns. Further, all LED anodes for a given row are connected together to constant-current unipolar row source drivers 301. Similarly, the cathodes for all the LEDs in a given column are connected together to unipolar column sink drivers 302. These drivers can be MOSFETs. Under the control of a controller 303, the array 300 can emit light by sequentially enabling each of the column drivers in turn, while row drivers can be enabled or disabled according to the desired output light. In addition to the row drivers, each row can also be equipped with a row sense-amplifier, thus forming a series of amplifiers. Individual amplifiers may allow the output from an LED to be acquired when it is operating as a photodiode. For example, the arrangement of FIG. 3 can include a current-to-voltage (I-V) converter stage (e.g., an FET-input operational amplifier 304 with a negative feedback resistor 305), also known as a transimpedance amplifier. The voltage outputs from the I-V converters can be directed into a multiple-channel analog-digital converter (ADC) 306. The ADC can supply digital values for any channel to the controller 303.

In one example, the driving circuitry for the LED matrix may scan the columns of the LED matrix sequentially (i.e., one column at a time). In this example, when the driving circuitry for the LED matrix enables a particular column, the driving circuitry may cause the even-numbered LEDs in the enabled column to operate in the light emitting mode, while causing the odd-numbered LEDs in the enabled column to operate in the light detecting mode for a predetermined first duration of time. During this first duration of time, the LCD device may monitor and store the output generated by the odd-numbered LEDs in the enabled column while ignoring the output from the even-numbered LEDs in the enabled column.

After the first duration of time has elapsed and while the particular column remains enabled, the driving circuitry may cause the even-numbered LEDs in the enabled column to operate in the light detecting mode, while switching the odd-numbered LEDs in the enabled column to operate in the light emitting mode for a predetermined second duration of time. During this second duration of time, the LCD device may monitor and store the output generated by the even-numbered LEDs in the enabled column while ignoring the output from the odd-numbered LEDs in the enabled column.

Next, after the second duration of time has elapsed and while the particular column remains enabled, the driving circuitry may cause all of the LEDs in the enabled column to operate as light detectors. During this third duration of time, the LCD device may monitor and store the output generated by all of the LEDs in the enabled column.

Finally, after the third duration of time has elapsed, the driving circuitry disables the particular column and repeats the above-described sequence for each of the remaining columns of the LED matrix. As will be appreciated, the driving circuitry may be configured to scan the columns of the LED matrix and switch the constituent LEDs of the LED matrix between operating in the light emitting and light detecting modes so quickly that the human eye may be unable to detect that the constituent LEDs of the LED matrix actually are being strobed in this manner. Instead, to the human eye, the LED matrix may appear to produce a substantially uniform field of white light in both time and space.

By performing the above-described column scanning sequence, the LCD device acquires photometric data from each of the LEDs in the matrix under two conditions: (1) when the LED's neighboring LEDs are emitting light; and (2) when the LED's neighboring LEDs are operating in the light detecting mode and, therefore, are dark. Based on this photometric data, the LCD device can determine if a touch has occurred in the vicinity of any of the LEDs within the matrix. For instance, if the photometric data acquired from a particular one of the LEDs in the matrix reveals that the light level detected by the particular LED falls within a first predetermined range while the particular LED's neighboring LEDs were emitting light and/or that the light level detected by the particular LED falls within a second predetermined range while the particular LED's neighboring LEDs were dark, the LCD device may register a touch as having occurred in the vicinity of the particular LED. This ability of the LCD device to consider both dark and light readings when determining if a touch is present may enable the LCD device to determine that a touch event has occurred irrespective of environmental (e.g., ambient) lighting conditions. Furthermore, it will be appreciated that this sensing mechanism enables the LCD device to detect multiple touch events at the same time.

It will be appreciated that the driving circuitry for the LED matrix may employ alternative driving sequences. For example, in some implementations, the driving circuitry for the LED matrix may be configured to scan multiple columns concurrently.

In some implementations, the driving circuitry for the LED matrix may cause the LEDs to emit light of a uniform and constant intensity when operating in the light emitting mode such that, to the human eye, the LED matrix appears to be generating white light of uniform intensity in space and time.

Alternatively, in other implementations, the driving circuitry for the LED matrix may dynamically modify the intensity of light emitted by the LEDs when operating in the light emitting mode in accordance with the video signal in order to locally dim areas of the LCD device to increase the effective contrast ratio of the output display image. In such cases, to the human eye, the intensity of the light emitted by the LED matrix may appear to vary spatially and temporally. Furthermore, when the LCD device dynamically modifies the intensity of light emitted by the LEDs when operating in the light emitting mode, the LCD device may adaptively modify the ranges within which light levels detected by individual LEDs are required to fall in order for touch events to be registered in the vicinity of the LEDs, thereby accounting for the intensity of light being emitted by neighboring LEDs during the sampling period.

In contrast to the example described above in which the driving circuitry for the LED matrix scans the columns of the LED matrix sequentially (i.e., one column at a time), in another example, the LED matrix may be driven in a more sophisticated progression that is substantially synchronized with the driving of the pixels of the liquid crystal layer. This technique for driving the LED matrix takes advantage of the fact that an LCD device can continue to generate satisfactory output images even when its backlight operates as a "scanning backlight," illuminating only certain portions of the liquid crystal layer at any given time in a high-speed multiplexed manner.

In this example, the pattern of LEDs operating in the light-emitting mode within the LED matrix is spatially modulated according to complex basis functions, such that only certain LEDs are operating in the light emitting mode at any given time, while the remaining LEDs within the LED matrix are operated in the light detecting mode and, thus, are kept dark. In those areas of the liquid crystal layer where no illumination is being received, the liquid crystal layer driving circuitry sets the pixels of the liquid crystal layer to "white," or a transmissive state, which enables light that enters the LCD device from the front surface of the LCD device in these regions to be sensed by the LEDs of the LED matrix in these regions which are operating in the light detecting mode.

Thus, effectively, at any one instant, certain portions of the LCD device are configured to display imagery, while the remaining portions are configured to operate as image sensors. By continuously cycling the regions that are displaying output images and the regions that are operating as image sensors, the LCD device effectively temporally multiplexes display and sensing functions. It will be appreciated that the LCD device may cycle the regions quickly enough that the human eye may not be able to detect that the regions are being cycled at all.

As an alternative to the example described above in which the pattern of LEDs operating in the light-emitting mode within the LED matrix is spatially modulated, all of the LEDs in the matrix of LEDs instead may be temporally modulated as a single unit such that all of the LEDs collectively are driven to alternate between operating in the light emitting mode and the light detecting mode. That is to say, the matrix of LEDs may be driven such that the entire matrix of LEDs alternates between operating in the light emitting mode and the light detecting mode. In such an implementation, the matrix of LEDs may be switched between operating in the light emitting and light detecting modes at a frequency that is high enough that, to the human eye, the matrix of LEDs appears to be generating a field of white light that is uniform in time.

In the implementations described above, the LEDs emit light in the visible spectrum, enabling the LED matrices to function as backlights for the LCD devices. In alternative implementations, a matrix of infrared (IR) LEDs (or LEDs configured to emit and detect light of other wavelengths outside of the visible spectrum) is positioned behind the liquid crystal layer of an LCD device. For example, in some implementations, the matrix of IR LEDs may be interleaved with the backlight of the LCD device (especially if the backlight of the LCD device is composed from an array of white LEDs) such that the array of IR LEDs does not interfere with the ability of the backlight to sufficiently illuminate the liquid crystal layer. Alternatively, the matrix of IR LEDs may be positioned behind the backlight of the LCD device. In some implementations, a backlight light guide plate that receives light from one or more white light sources may be employed to provide the backlight required to generate output images.

Figure 2:
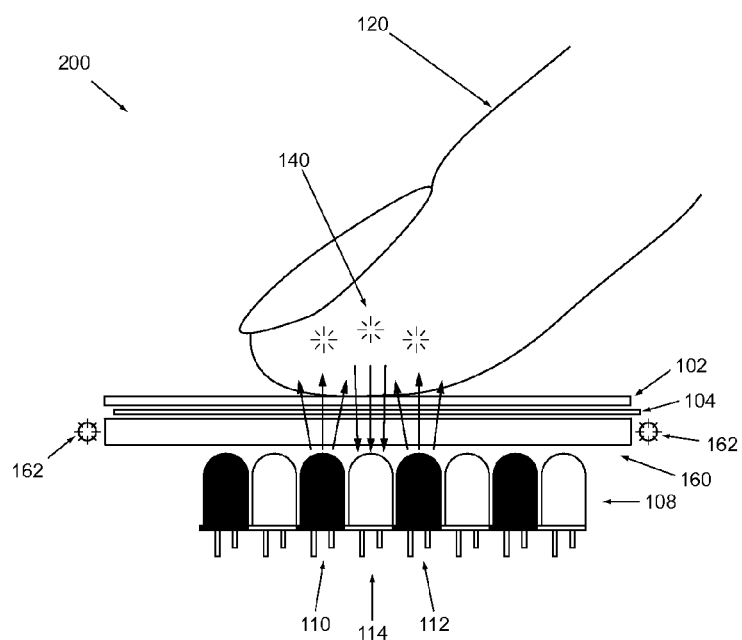

FIG. 2 is a schematic diagram of an LCD device 200 that includes a liquid crystal layer 102 (e.g., including individual pixels of liquid crystal material) behind which one or more diffuser and/or enhancement films 104 and a backlight light guide plate 160 are positioned. One or more white light sources 162 (e.g., one or more cold cathode fluorescent lamps (CCFLs) and/or one or more white LEDs) are positioned adjacent to one or more surfaces of backlight light guide plate 160 and are configured to inject white light into the backlight light guide plate 160. The backlight light guide plate 160 is configured to internally transmit this injected light while allowing some of it to escape from its surface facing the liquid crystal layer 102 such that the escaped light illuminates the liquid crystal layer 102, thereby providing the backlight necessary for the LCD device 200 to generate output images. Each of liquid crystal layer 102, film(s) 104, and backlight light guide plate 160 are selected such that or configured to be transparent to, or at least partially transmissive to, light in the IR spectrum.

LCD device 200 also includes a matrix of IR LEDs 108 positioned behind the backlight light guide plate 160. The LCD device 200 is configured to selectively switch the individual IR LEDs of the IR LED matrix 108 between operating in the light emitting and light detecting modes. For example, as illustrated in FIG. 2, the LCD device 200 is driving the individual IR LEDs of the LED matrix 108 such that alternating IR LEDs are operating in the light emitting and light detecting modes. Specifically, IR LEDs 110 and 112 are operating in the light emitting mode and emitting light in the IR spectrum while IR LED 114 is operating in the light detecting mode. As a result, when finger 120 approaches or comes in contact with LCD device 200, light emitted by IR LEDs 110 and 112 in the IR spectrum may be scattered (e.g., as illustrated by scattered IR light 140) and/or reflected by finger 120 such that a portion of this scattered and/or reflected light enters and passes through the liquid crystal layer 102, film(s) 104, and backlight light guide plate 160 of LCD device 200, where it is detected by IR LED 114 operating in the light detecting mode. The LCD device 200, therefore, can detect the presence of finger 120 and register a touch event in the vicinity of IR LED 114 based on output generated by IR LED 114 in response to sensing the light scattered and/or reflected by finger 120.

As with the matrix of white LEDs described above, the matrix of IR LEDs is electrically configured to operate its constituent LEDs in both the light emitting and light detecting modes. Consequently, the apparatus is able to sense objects or fingers approaching to or in contact with the front display surface based on changes in IR incident on the LED matrix that are observed by one or more of the IR LEDs operating in the light detecting mode, for example, as a consequence of the objects or fingers reflecting and/or scattering IR emitted by other of the IR LEDs in the LED matrix operating in the light emitting mode. In such implementations that employ matrices of IR LEDs, the components of the liquid crystal layer are configured or chosen to be at least partially transmissive to IR and also such that they do not significantly spatially modulate IR. Because the components of the liquid crystal layer are configured in this manner, the ability of the IR LED matrix to sense IR light may not be impeded by the polarization states of the individual pixels of the liquid crystal layer positioned in front of the IR LED matrix.

The IR LED matrix may be arranged as described above in connection with the white LED matrices and as illustrated, for example, in FIG. 2. Moreover, the driving circuitry for the IR LED matrix may drive the IR LEDs of the IR LED matrix in similar sequences to those described above in connection with the white LED matrices. For example, the driving circuitry for the IR LED matrix may drive the IR LEDs of the IR LED matrix according to the column scanning technique described above in connection with the white LED matrices, except, in some cases, the driving circuitry for the IR LED matrix may omit the phase of simultaneously operating each of the IR LEDs in an enabled column in the light detecting mode.

A number of implementations have been described. Nevertheless, it will be understood that various modifications may be made. For example, in some implementations, the individual white LEDs of the above-described white LED matrices may be replaced by red, green, and blue LED triplets. It will be appreciated that such RGB LED triplets may be driven to operate substantially similarly as the individual white LEDs of the above-described white LED matrices. For instance, the RGB LED triplets may be driven such that individual RGB LED triplets alternate between operating in the light emitting mode and the light detecting mode. When an individual RGB LED triplet is driven to operate in the light emitting mode, all of the LEDs in the triplet (i.e., each of the red, green, and blue LEDs in the triplet) may be driven to emit light, or, alternatively, only particular ones of the LEDs of the triplet may be driven to emit light. Similarly, when an individual RGB LED triplet is driven to operate in the light detecting mode, all of the LEDs in the triplet (i.e., each of the red, green, and blue LEDs in the triplet) may be driven to sense light, or, alternatively, only particular ones of the LEDs of the triplet may be driven to detect light (e.g., only the red LED of the triplet may be driven to detect light). Additionally or alternatively, when individual RGB LED triplets are operating in the light detecting mode, the LCD device may process output from all of the LEDs in the triplets, or, alternatively, the LCD device may process output from only particular ones of the LEDs in the triplets, choosing to ignore the output(s) from the other LED(s) in the triplets.

Furthermore, although specific examples of spatial and temporal patterns for alternating the constituent LEDs of the above-described LED matrices between operating in the light emitting and light detecting modes are provided above, any spatial and/or temporal pattern for alternating the constituent LEDs between the light emitting and light detecting modes may be employed. For instance, all of the above-described LED matrices can be operated such that each of their constituent LEDs are operating in the same mode concurrently. That is to say, the LED matrices can be operated so that all of the LEDs alternate between concurrently being operated in the light emitting mode and concurrently being operated in the light detecting mode.

In some of the disclosed implementations, touch events may be registered based on changes in light observed by one or more LEDs in the disclosed LED matrices that result from light being scattered, reflected, and/or occluded by input mechanisms such as, for example, fingers, that are contacting or approaching the LCD devices. Additionally or alternatively, frustrated total internal reflection-(FTIR) based touch sensors, such as, for example, those described in co-pending, commonly owned U.S. patent application Ser. Nos. 11/833,908 and 12/185,782, both of which are incorporated herein by reference in their entireties, may be incorporated within the disclosed implementations, and touch events may be registered based on changes in light observed by one or more LEDs in the disclosed LED matrices that result from light escaping from the FTIR-based touch sensors as a consequence of contact being made with the LCD devices by appropriate input mechanisms, such as, for example, fingers.

Additionally or alternatively, although the constituent LEDs of the disclosed LED matrices generally are described as being driving such that they alternate between operating in the light emitting and light detecting modes, in some implementations, one or more of the constituent LEDs of an LED matrix may be configured to always operate in the light emitting mode and/or one or more constituent LEDs of the LED matrix may be configured to always operate in the light detecting mode.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A display device configured to display output images and sense input user interaction comprising:

a liquid crystal layer including individually addressable pixels of liquid crystal material;

first driving circuitry that selectively controls transmissivity to light in the visible spectrum of individual ones of the pixels of the liquid crystal layer;

a matrix of light emitting diodes positioned behind the liquid crystal layer, the matrix including a plurality of light emitting diodes being arranged in rows and columns;

second driving circuitry that operates a first subset of spatially distributed light emitting diodes to alternatively emit light through the liquid crystal layer and detect light transmitted through the liquid crystal display, while the first subset of spatially distributed light emitting diodes is being operated to emit light, the second driving circuitry operates a second subset of spatially distributed light emitting diodes of the plurality of light emitting diodes to detect light transmitted through the liquid crystal layer, and while the first subset of light emitting diodes is being operated to detect light, the second driving circuitry operates the second subset of spatially distributed light emitting diodes to detect light transmitted through the liquid crystal layer, and wherein each of the first and second subsets of spatially distributed light emitting diodes emit light to provide a uniform plane of light as backlight illumination for the liquid crystal layer;

an electronic storage device that stores output representative of a light level received from each of the plurality of light emitting diodes when the light emitting diode is being operated to detect light; and a processing element that determines that a user input event has occurred proximate to a light emitting diode, if a light level detected by the light emitting diode is in a predetermined range.

2. The display device of claim 1 further comprising an enhancement film positioned between the liquid crystal layer and the matrix of light emitting diodes.

3. The display device of claim 1 wherein the processing element determines if more than one touch input has occurred based on results of processing the output received from the light emitting diodes that is stored in the electronic storage device.

4. The display device of claim 1 wherein the second driving circuitry dynamically modifies an intensity of light emitted by light emitting diodes operated to emit light in accordance with a video signal, and responsive to the intensity of light being dynamically modified, adaptively modify the predetermined range to account for the intensity of light being dynamically modified.

5. The display device of claim 4 wherein the intensity of light emitted by the light emitting diodes is dynamically reduced to increase an effective contrast ratio of an output image displayed by the display device.

6. The display device of claim 1 further comprising a controller that coordinates operation of the first driving circuitry and the second driving circuitry such that the second driving circuitry causes certain ones of the light emitting diodes to detect light while the first driving circuitry concurrently causes corresponding ones of the individually addressable pixels of the liquid crystal layer that would be illuminated by the certain light emitting diodes if operated in the light emitting mode to be transmissive to visible light.

7. The display device of claim 6 wherein the controller configured to controls the second driving circuitry to cause the light emitting diodes to operate in a pattern that is temporally modulated and controls the first driving circuitry to cause the individually addressable pixels of the liquid crystal layer to operate in synchronization with the pattern such that pixels of the liquid crystal layer are set to a transmissize state when corresponding light emitting diodes operated to detect light.

8. The display device of claim 6 wherein the controller controls the second driving circuitry to cause the light emitting diodes to operate in a pattern that is spatially modulated and controls the first driving circuitry to cause the individually addressable pixels of the liquid crystal layer to operate in synchronization with the pattern such that pixels of the liquid crystal layer are set to a transmissize state when corresponding light emitting diodes operate in the light detecting mode.

9. The display device of claim 8 wherein the controller controls the second driving circuitry to cause the light emitting diodes to operate in a pattern that is spatially modulated in accordance with a basis function.

* * * * *